United States Patent [19]
Culver

[11] Patent Number: 5,475,722
[45] Date of Patent: Dec. 12, 1995

[54] NUCLEAR THERMAL ROCKET ENGINE AND NOZZLE THEREFOR

[75] Inventor: Donald W. Culver, Sacramento, Calif.

[73] Assignee: Aerojet General Corporation, Rancho Cordova, Calif.

[21] Appl. No.: 324,055

[22] Filed: Oct. 14, 1994

[51] Int. Cl.⁶ ..................................................... G21D 5/02
[52] U.S. Cl. ..................... 376/318; 376/223; 376/386; 376/387; 376/909; 60/203.1
[58] Field of Search ..................................... 376/223, 302, 376/304, 317, 318, 319, 385, 386, 387, 388, 395, 458, 909; 60/203.1, 263, 264, 266

[56] References Cited

U.S. PATENT DOCUMENTS

| 3,793,832 | 2/1974 | Moon | 376/318 |
| 3,817,029 | 6/1974 | Frisch | 376/318 |

Primary Examiner—Daniel D. Wasil
Attorney, Agent, or Firm—Townsend and Townsend and Crew

[57] ABSTRACT

A nuclear thermal rocket engine is provided with an integrated and compact construction that facilitates vehicle size and weight reduction. The engine includes a nuclear reactor core having multiple fuel assemblies and moderator rods disposed therebetween. A reactor vessel surrounds a reflector assembly which surrounds the core and includes multiple passages formed therein for circulating coolant therethrough. The reactor vessel is surrounded by a nozzle assembly which includes a nozzle block having a plenum fluidly coupled to the outlets of the fuel assemblies and a nozzle throat region. Multiple struts extend from the reactor vessel and through the nozzle throat region to divide that region into multiple nozzle throats. Each strut includes multiple channels for circulating coolant (e.g., gaseous propellant) through the reflector assembly coolant passages and reactor core to extract heat energy from the reactor and recirculating that propellant to the fuel assemblies before being exhausted through the nozzle assembly. With this configuration, coolant can be provided to the reflector assembly without allocating valuable fuel assembly space to coolant channels. This construction also facilitates placing the reactor and nozzle in parallel with respect to the axial direction of the nozzle which further enhances the compact construction of the engine. In addition, the nozzle block, fuel assembly support and recuperator, which is provided to facilitate heat exchange from the reactor, form portions of the gamma shield, thereby reducing the weight impact of these elements on the rocket engine.

18 Claims, 7 Drawing Sheets

5,475,722

NUCLEAR THERMAL ROCKET ENGINE AND NOZZLE THEREFOR

BACKGROUND OF THE INVENTION

The invention generally relates to nuclear thermal rocket engines. More particularly, the invention relates to a nuclear rocket and engine nozzle assembly therefor.

Nuclear rockets generally use a solid-fuel element reactor to heat a single liquid propellant. Some of the propellant is first used to cool chamber walls and reflectors before injection into the reactor heating chamber. Gamma shields are generally provided to protect crew members from reactor fluence. Gamma shields generally add to the weight of the engine, which is clearly undesirable during launch. Attempts to integrate gamma shield mass into the engine components have been limited in scope or have resulted in cooling configurations that consume valuable fuel rod space, resulting in lower power capabilities.

SUMMARY OF THE INVENTION

The present invention is directed to a nuclear thermal rocket engine that avoids the problems and disadvantages of the prior art. According to the present invention, a nuclear thermal rocket engine is provided with an integrated and compact construction that facilitates weight reduction without sacrificing power capabilities. The engine includes a nuclear reactor core having multiple fuel assemblies and moderator rods disposed therebetween. A reflector assembly surrounds the core and includes multiple passages formed therein for circulating coolant through the reflector assembly. A reactor vessel surrounds the reflector assembly and nuclear reactor core and, in turn, is surrounded by a nozzle assembly. The nozzle assembly includes a nozzle block having a plenum fluidly coupled to the outlets of the fuel assemblies. Multiple struts extend from the reactor vessel and through the nozzle throat region to divide that region into multiple nozzle throats. Each strut has a channel formed therein that is fluidly coupled to at least one of the passages in the reflector assembly. With this configuration, coolant (e.g., gaseous propellant) can be provided to the reflector assembly without allocating valuable fuel assembly space to coolant channels. This assures that the relatively small reactor having a limited number of fuel assemblies, due to size constraints, can go critical. Although the multiple throat configuration provides a relatively high heat transfer area that is exposed to the hot exhaust gases, the coolant passages in the struts also protect the struts from those very high temperature gases passing through the nozzle throats. The heat flux could otherwise adversely affect the mechanical properties of the struts (components intended to support the reactor and hold it to the vehicle).

Another advantageous feature of the invention is that the reactor and nozzle are assembled in parallel with regard to axial length, rather than in series as is conventional in the art. This further facilitates the compact construction of the rocket engine.

According to another aspect of the invention, the nozzle block is positioned between the aft end of the space vehicle to which the engine is attached and the reactor core, and is constructed from material that shields gamma rays such as tungsten. In this manner, gamma shield mass is integrated into the nozzle block, thereby reducing vehicle weight characteristics.

The gamma shield nozzle block also protects the motors that control the position of the control drums in the reflector assembly. That is, the reflector assembly includes a reflector block and control drums. The reflector assembly passages are formed in the reflector block and the control drums are rotatably mounted in selected reflector assembly passages. Each control drum is spaced from the reflector block to permit coolant from the strut channels to pass between the reflector block and control drums and, thus, cool the control drums. Each control drum motor has a shaft that extends through a respective strut channel before being coupled to one of the control drums. Thus, the nozzle block is positioned between the reactor core and the control drum motors, thereby protecting the safety system (i.e., the control drum controls) from the full reactor fluence.

According to another advantageous feature of the invention, tungsten shrouds that form portions of the nozzle block are positioned around the struts in the nozzle throat region and are spaced from the struts to minimize heat transfer between each respective strut and shroud pair. In this manner, the struts can be cooled as described above without cooling the gas passing through the nozzle throats. Cooling the gas can result in specific impulse drops which reduce fuel efficiency when fuel tank space is at a premium. The struts and shrouds also preferably have a generally teardrop-shaped transverse section to enhance aerodynamic characteristics.

The struts are also provided with a return channel for cycling the coolant to the fuel assemblies after it has passed through the reflector assembly and along a passageway extending between a number of the moderator rods. A recuperator is coupled to the struts and includes an inlet fluidly coupled to the return channel and an outlet fluidly coupled to the fuel assemblies, whereby heat can be transferred from the return fluid, and thus from the reflector assembly and reactor core, to the recuperator. That energy can then be used to run the turbine that drives the propellant pump. More specifically, the engine further includes a pump and a turbine and the recuperator further includes a second inlet and outlet. The pump has an outlet coupled to the second inlet of the recuperator and the turbine has an inlet coupled to the second outlet of the recuperator.

According to a further aspect of the invention, the turbine has an outlet fluidly coupled to the first channel in the strut. Thus, the turbine exhaust gas is used to cool the struts and the reactor. That is, the struts and reactor are cooled with relatively low pressure exhaust gas, thereby reducing wall thickness requirements. In this manner, the wall thickness of the reactor vessel can be reduced, thereby reducing vehicle weight.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENT

Figure 1:
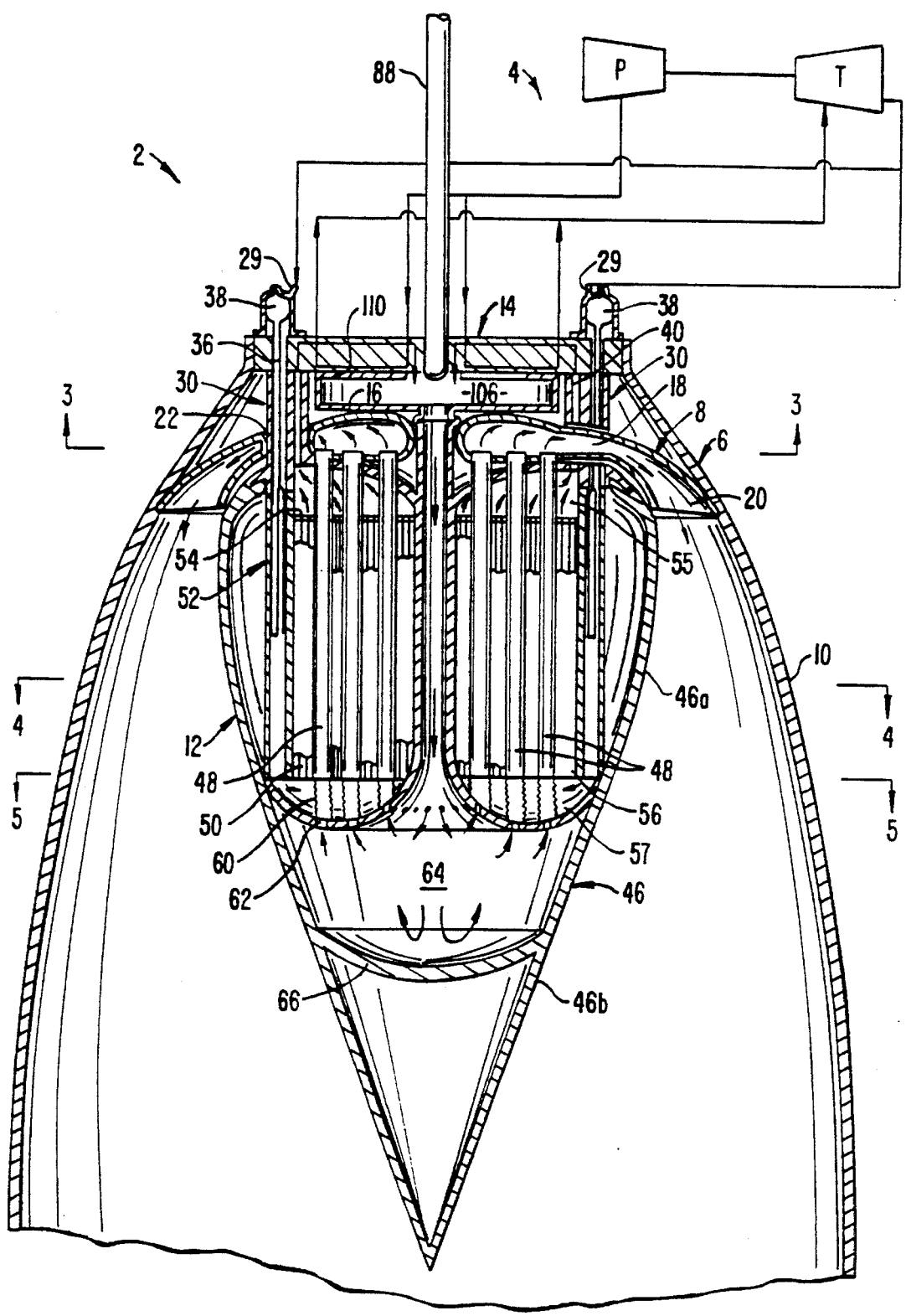
FIG. 1 is a sectional view of a nuclear thermal rocket engine constructed according to the principles of the present invention with the feed system diagrammatically illustrated in simplified form.

Referring to the drawings in detail, wherein like numerals indicate like elements, a nuclear thermal rocket engine 2 is shown according to the principles of the present invention. Referring to FIG. 1, nuclear thermal rocket engine 2 generally includes a primary feed system 4, a nozzle assembly 6, which generally includes a nozzle block or support member 8 and nozzle extension 10, a reactor 12, which is positioned or housed in nozzle assembly 6, and a heat exchanger or recuperator 14. Feed system 4 generally includes a pump P and turbine T for circulating rocket propellant, preferably liquid hydrogen, through recuperator 14 and reactor 12 before the propellant is accelerated through the throats of nozzle assembly 6 as will be described in more detail below. Although a single pump and turbine is shown in FIG. 1, it should be understood that this is done for simplification. In the preferred embodiment, multiple pumps and turbines are used as shown in the flow diagram illustrated in FIG. 11.

Figure 3:
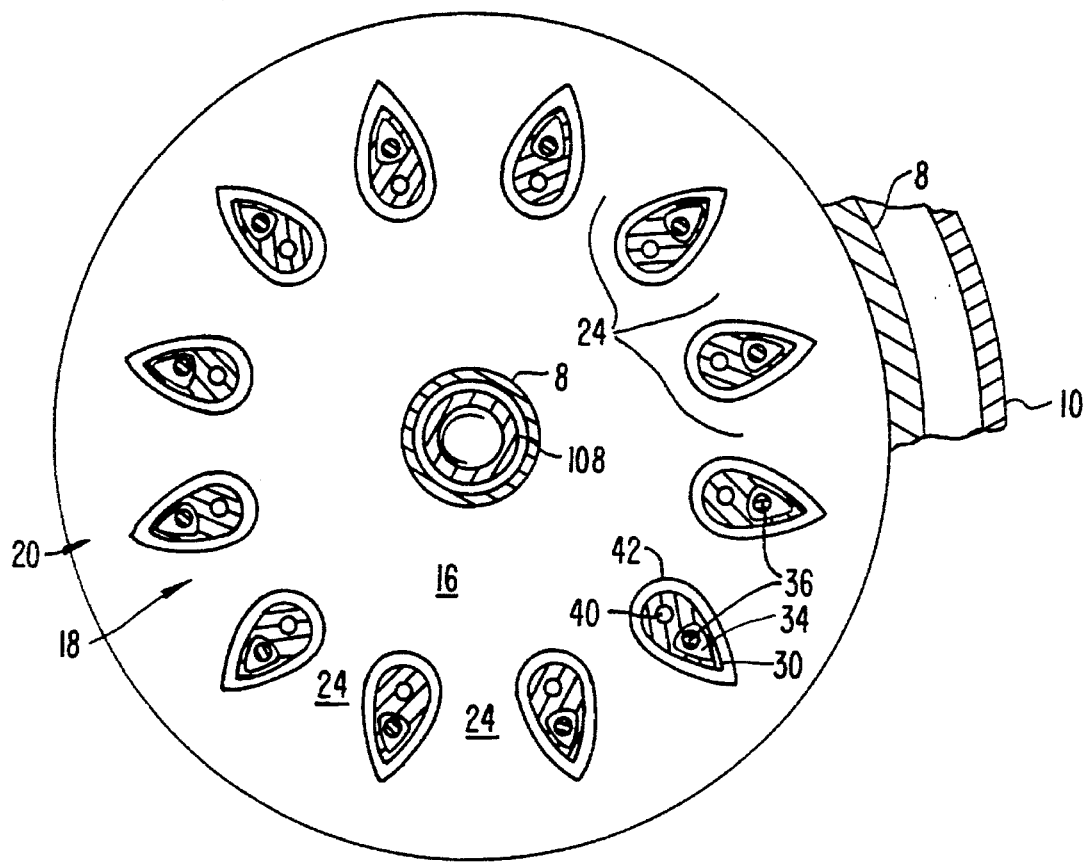
FIG. 3 is a sectional view of the nozzle assembly taken along line 3—3 in FIG. 1 showing the struts in transverse section.

Referring to FIG. 1, nozzle assembly 6 includes nozzle block or support member 8 which is positioned within nozzle extension 10. Nozzle block 8 is constructed to form a gamma shield and, thus, preferably is tungsten alloy. Nozzle block 8 includes a central plenum or subsonic portion 16, nozzle throat or sonic portion 18, and propellant exhaust or supersonic portion 20. Portions 16 and 20 preferably are generally annular as shown in the drawings so that propellant can be exhausted uniformly within nozzle extension 10. Nozzle extension 10 has an expansion deflection (ED) nozzle configuration and diverges in a direction away from nozzle block 8 and preferably is carbon carbon material coated with a hydrogen-resistant material such as a silicide. Nozzle throat portion 18, which is positioned between the converging upstream portion of plenum portion 16 and the diverging downstream portion of exhaust portion 20, has a plurality of circumferentially spaced axial holes 22 formed therethrough for receiving struts 30. Struts 30 divide nozzle throat portion 18 into a plurality of nozzle throats 24 as illustrated in FIG. 3 wherein only 3 of the 12 struts are shown in detail for purposes of simplification. The section of the nozzle block shown in FIG. 1 is staggered to show one of the throats between adjacent struts to the right and a longitudinal section of a strut to the left.

Figure 2:
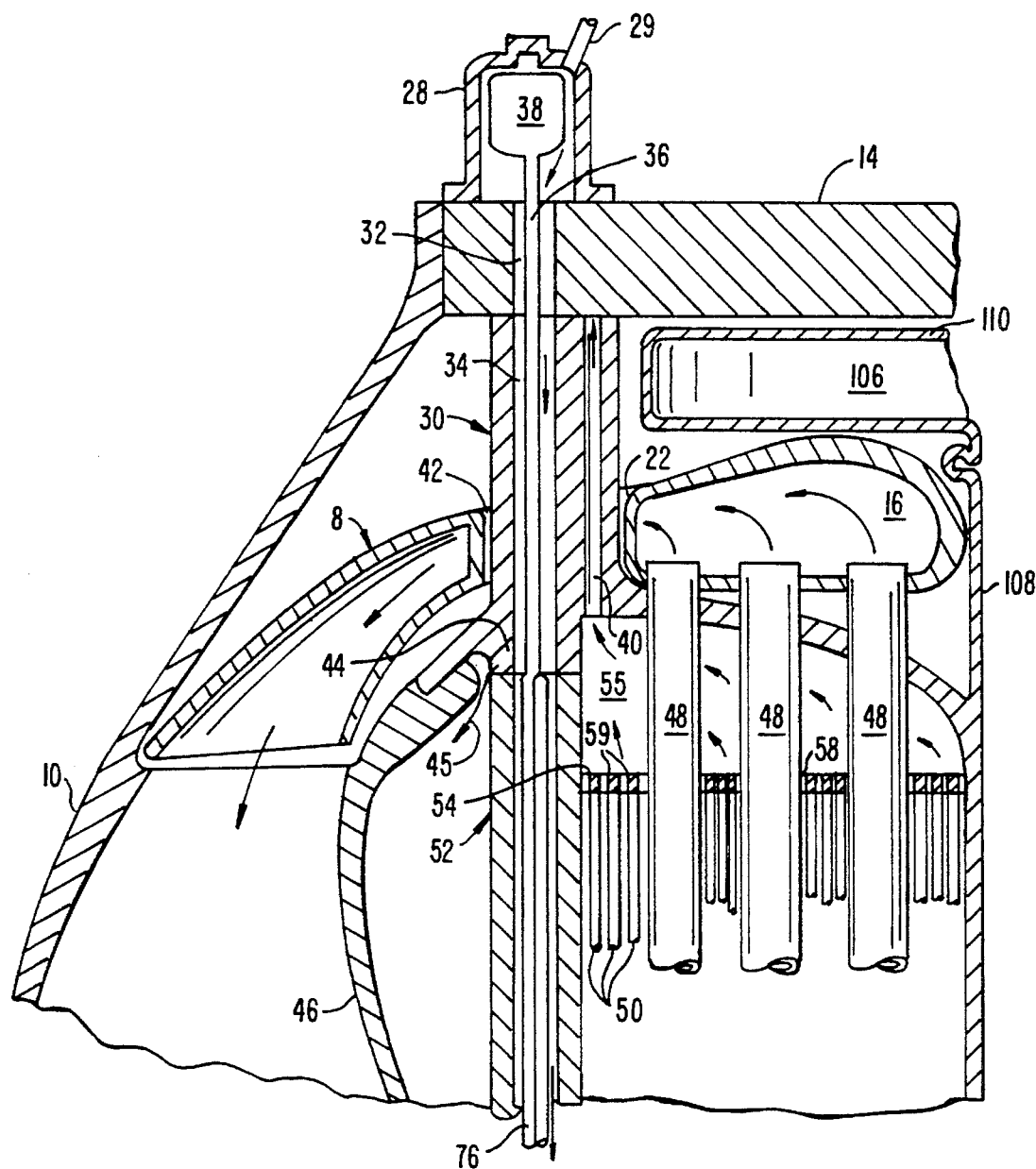
FIG. 2 is an enlarged view of the upper left portion of the engine of FIG. 1.
Figure 6:
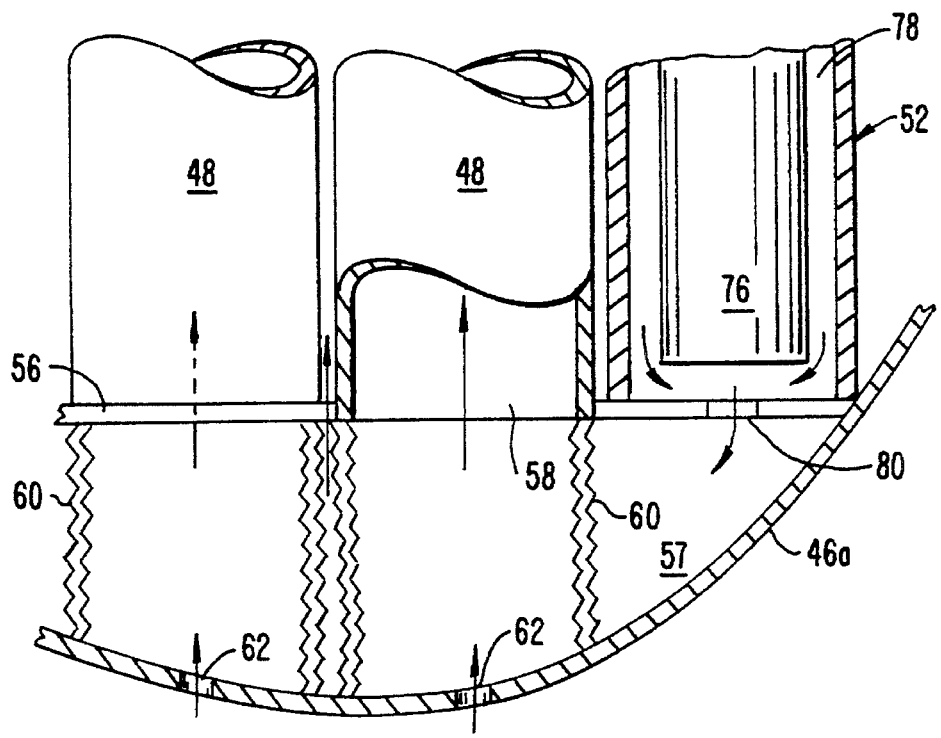
FIG. 6 is an enlarged view of the lower right portion of the reactor of FIG. 1.

Referring to FIGS. 1–3, each strut 30, which preferably is a high nickel alloy to best withstand structural damage generally caused by nuclear fluence, includes a central opening or channel 34 that extends through the entire axial dimension of the strut. Each opening or channel 34 has an inlet fluidly coupled to manifold 28, which is preferably annular, via one of a plurality of circumferentially spaced axial passageways 32 formed through recuperator 14 and an outlet fluidly coupled to the interior of reactor 12, as shown in FIGS. 1 and 6 via reflector assembly 52. Each channel 34 also is configured to receive a control drum shaft 36 which has one end coupled to a drive or motor 38, which is housed in manifold 28, and another end coupled to a control drum that is rotatably mounted in the reflector assembly as will be described in more detail below. Channel 34 is sized to have a transverse dimension substantially larger than that of control drum shaft 36 to form an annular flow channel therebetween. Each strut 30 also includes axial channel 40 that extends therethrough. Channels 40 fluidly couple the reactor core to recuperator inlets to return the gaseous propellant to recuperator 14 as will be described in more detail below. Struts 30 also can be provided with radially extending channels 44 so that relatively cool fluid can be discharged toward the inner wall surface of reactor vessel 46, as shown with arrow 45 in FIG. 2, to facilitate cooling the vessel.

A shroud 42 is positioned around each strut 30, preferably along the entire inner axial dimension of the nozzle block, and spaced from the strut to prevent the hot propellant gases from contacting strut 30. Otherwise the lower temperature propellant flow in struts 30 could draw heat from the hot gases passing through nozzle throats 24, which can result in propellant-specific impulse drops, which, in turn, reduce system efficiency when propellant mass and volume reductions are at a premium. Each shroud is configured to have a shape essentially corresponding to that of a respective strut and to provide sufficient space therebetween, to facilitate radiation cooling of the shroud and maintain its operating temperature at about 2700°–2800° K. The particular dimensions depend on engine size. According to the preferred embodiment, the shroud is tungsten alloy and the strut is nickel alloy to optimize thermal nuclear shielding and structural requirements. For example, the nickel alloy provides excellent heat transfer and structural integrity, which is important since the struts attach the reactor to the vehicle, preferably by way of the recuperator. The tungsten is suited for the high temperature environment in the nozzle throat region. Preferably, the strut and shroud transverse configurations also are teardrop shaped as shown in FIG. 3 to enhance aerodynamic characteristics.

Figure 4:
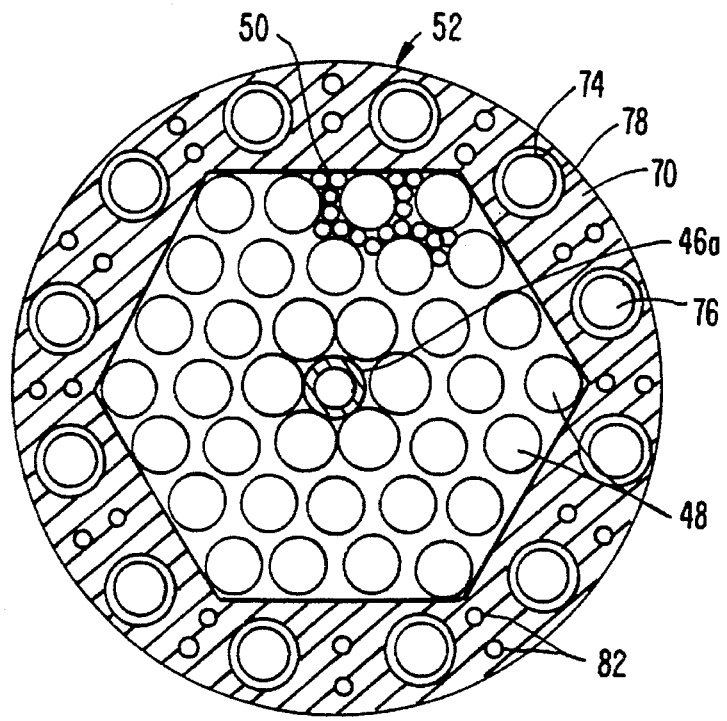
FIG. 4 is a sectional view of the reactor taken along line 4—4 in FIG. 1.

Referring to FIGS. 1, 2 and 4, nozzle assembly 6 houses reactor 12, which generally includes fuel assemblies or rods 48 and moderator rods 50 disposed therebetween as is conventional in the art. The fuel assemblies and moderator rods, both of which can be of conventional construction, are surrounded by reflector assembly 52, which, in turn, is encased in the upper portion 46a of reactor vessel 46. In the preferred embodiment, upper portion 46a is toroidal and lower portion 46b is conical and tapers in the downstream direction to enhance the aerodynamic characteristics of reactor vessel 46 around which exhaust gas flows.

Figure 5:
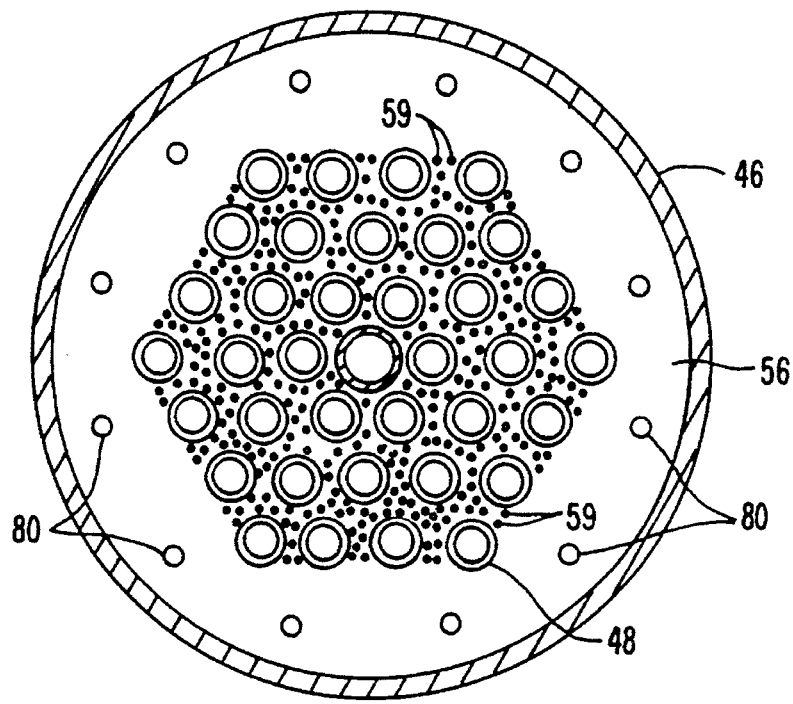
FIG. 5 is a sectional view of the reactor taken along line 5—5 in FIG. 1 showing the upper surface of the lower support plate.

Upper and lower support plates 54 and 56 are provided above and below moderator rods 50 to form a boundary between the reactor core and upper and lower reactor plenums 55 and 57. Each support plate includes a plurality of through holes 58 (see, e.g., FIGS. 2 and 6) for receiving fuel assemblies 48 and a plurality of apertures 59 (see, e.g., FIGS. 2 and 5) between holes 58 to facilitate fluid flow from lower plenum 57 to upper plenum 55 through the spaces between moderator rods 50. Upper plenum 55 is fluidly coupled to strut channels 40, while lower plenum 57 is fluidly coupled to strut channels 34 through reflector assembly 52.

Referring to FIG. 2, the downstream end portions of fuel assemblies 48 pass through holes 58 in the upper plate 54 and holes formed in the upper portion of reactor vessel 46 and the lower portion of nozzle plenum 16 so that the fuel assembly outlets are fluidly coupled with nozzle throats 24. In order to secure the reactor core in position, the downstream portions of fuel assemblies 48 are fixedly secured to the upper portion of reactor vessel 46 by welding, for example. The nozzle block and upper plate 54 are secured in place also by fixedly securing these elements to the downstream portions of fuel assemblies 48 (see, e.g., FIG. 2), for example by welding. In sum, the upper portion of vessel 46 supports the fuel assemblies, which, in turn, support the nozzle block and upper plate 54.

The nozzle block, the fuel assembly support, which comprises the upper portion of reactor vessel 46 that extends between the nozzle block and the reactor, and the recuperator all form portions of the gamma shield, a heavy and necessary part of the rocket engine. In this manner, gamma shield mass is integrated into the nozzle block, fuel assembly support and recuperator, thereby reducing or eliminating the weight impact of these elements on the rocket engine. In the preferred embodiment, these elements are positioned between the aft end of the space vehicle to which the engine is attached and the reactor core, and are constructed from material that attenuates gamma rays.

Referring to FIG. 6, the upstream end portions of fuel assemblies 48 are slidably received in holes 58 of lower plate 56. A plurality of generally cylindrical members 60 also are provided between the outer surface of support plate 56 and the toroidal portion of reactor vessel 46, as shown in FIGS. 1 and 6, to provide discrete fluid flow passages. More specifically, each cylindrical member 60 has an upper end secured to a respective fuel assembly. The other end of each cylindrical member 60 is secured to the toroidal portion 46a of the reactor vessel. A plurality of through holes 62 are provided in the reactor vessel to fluidly couple the interior of each cylindrical member 60 with lowermost plenum 64 which is bounded at its lower portion by curved, disc-shaped wall 66. Cylindrical members 60 preferably have a bellows construction to compensate for axial thermal expansion of fuel assemblies 48.

Referring to FIG. 4, reflector assembly 52 generally includes neutron reflector block 70, which can comprise a single block or plurality of smaller blocks of neutron reflecting material such as beryllium, and a plurality of control drums 76. Each control drum 76 is rotatably mounted within a cylindrical passage 74 formed in reflector block 70 and is coupled to a control drum shaft 36 as is conventional in the art. Each cylindrical passage 74 is configured so that an annular channel 78 is formed between the outer surface of a respective drum and reflector block 70. Referring to FIG. 1, reflector block 70 is arranged such that each central opening 34 formed in a respective strut 30 is aligned with a respective annular channel 78 in which a respective control drum 76 is positioned. Each control drum 76 includes a neutron-absorbing side and a neutron reflecting side to facilitate control of the reactor power as is conventional. Accordingly, one side of the control drum can be boron carbide and the other side beryllium. Thus, when the control drum is rotated so that the boron carbide side faces the reactor core, the reactor power is lowered.

Referring to FIG. 6, a plurality of holes 80 are provided through support plate 56 to fluidly couple each annular channel 78 with lower plenum 57. A plurality of coolant holes 82 (FIG. 4) also can be provided in block 70 to facilitate uniform cooling of the block. In this case, the gaseous propellant or coolant being delivered to the control drums via strut channels 34, as will be discussed in more detail below, can be manifolded or channeled to flow through coolant holes 82 as well as channels 78. Additional holes also would be provided in support plate 56 to fluidly couple coolant holes 82 with lower plenum 57.

Referring to FIGS. 7–10, recuperator or heat exchanger 14 also forms a portion of the gamma shield. Recuperator 14 includes an essentially uniform and dense array of generally radially extending channels and generally axially extending passages to maximize heat transfer in a very compact mass and provide uniform gamma shielding characteristics. In order to accommodate the dense array of numerous channels and passages, platelet technology preferably is used to construct recuperator 14. Platelet technology facilitates manufacture of structural components where thin walls with minute and precisely engineered flow passages in complex patterns or thin walls with complex internal supporting structure are needed. In the preferred embodiment, recuperator 14 generally comprises a stack of bonded platelets. The stack of platelets that forms the recuperator is formed by fusing adjacent platelets. The flow passages and channels are formed by through-passages or surface recesses in the individual platelets, with the passages or recesses in adjacent platelets superimposed to achieve the desired network or flow path through the stack. These passages or recesses can be formed in a variety of ways, one of the most prominent of which is photo etching. Etching to form through-passages which penetrate the thickness of a platelet is commonly termed "through etching," while etching to form a recess in one side of the platelet without fully penetrating the platelet is commonly termed "depth etching." Suitable etching techniques are disclosed in U.S. Pat. No. 3,413,704, which is hereby incorporated herein by reference.

The fusing of the plates together in the stack is accomplished in any of a variety of ways. Examples are diffusion bonding and furnace brazing. Diffusion bonding is a particularly effective method, which involves hot-pressing the platelets together using pressures typically in the range of 6.9 to 20.7 MPa (1,000 to 3,000 psi) at temperatures typically in the range of 455°–540° C. Although the heat exchanger is described herein as comprising a plurality of platelets to illustrate the preferred embodiment, the platelet description is not intended to limit the scope of the invention. The array of channels and passages can be formed using other techniques that would be apparent to one of skill.

Figure 9:
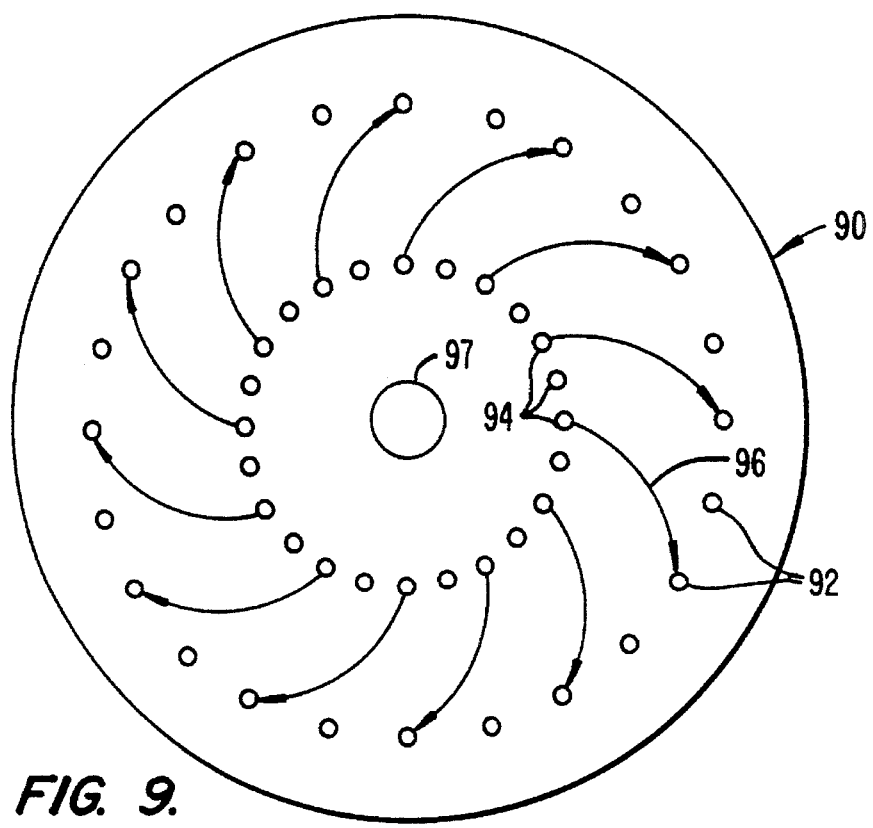
FIG. 9 is a top view of one of the heat exchanger plates, a plurality of which are stacked together to form the heat exchanger of FIG. 1, diagrammatically showing the flow channels which are formed therein and provide a radially outward involute flow pattern.
Figure 10:
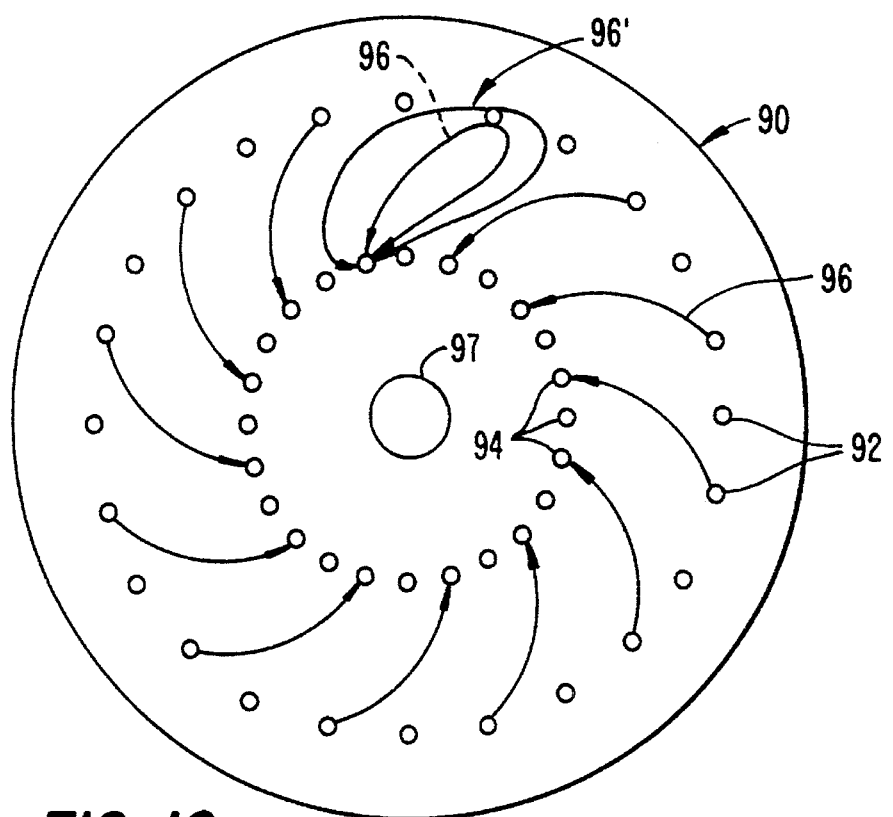
FIG. 10 is a top plan view of a heat exchanger plate constructed for positioning above or below the heat exchanger plate of FIG. 8 diagrammatically showing the flow channels which are formed therein and provide a radially inward involute flow pattern.

Two of the platelets, which form recuperator 14, are shown in FIGS. 9 and 10 and designated with reference numeral 90. Platelets 90 preferably are ultrathin sheets of metal, e.g., stainless steel, and preferably have a thickness in a range of about 0.002 to 0.020 inches and a diameter of about 0.5 to 1 meter depending on the required engine size.

In the preferred embodiment, each platelet is provided with a plurality of circumferentially spaced outer holes 92 (e.g., 40 in number) and preferably an equal number of inner circumferentially spaced holes 94. Each platelet also includes radial channels or grooves which are diagrammatically represented according to their general configuration with arrows 96 in FIGS. 9 and 10. Channels or grooves 96 are formed in the upper surface of each platelet and extend between and fluidly couple alternate pairs of circumferentially spaced holes as shown in the drawings. The arrows show the flow direction of alternate grooves or groove groups as will be described in more detail below. The grooves preferably are rectangular in cross-section and have a width of about 20 to 90 mils and a depth of about 5 to 20 mils. Each platelet also includes a center hole 97 for forming a central passageway in the recuperator when the platelets are stacked. A poison rod 88 is slidably mounted in that central passageway (FIG. 1) so that it can be inserted into the center hole of the reactor vessel to arrest the reactor in case of emergency. The holes that form passageways 32 are not shown in FIGS. 8 and 9 for purposes of simplification. However, it is noted that since control drum shafts 36 essentially fill passageways 32 and the center hole is filled with poison rod 88, the overall density of the heat exchanger is substantially uniform.

In stacking platelets 90, the platelets are arranged so that holes 92 and 94 in adjacent platelets are substantially aligned to form a multitude of passages that are generally perpendicular to channels 96 and extend through the thickness of the recuperator. In the preferred embodiment, the platelets are clocked in one direction, either clockwise or counterclockwise. That is, before the platelets are fixed in position, adjacent platelets are rotated relative to one another by about ½ to 3°, for example, so that holes 92 and 94 in one platelet are slightly offset from holes 92 and 94 in an adjacent platelet, but are still fluidly coupled therewith. For example, a platelet oriented as shown in FIG. 9 is stacked above or below a platelet oriented as shown in FIG. 10 and the platelets rotated so that holes 92 and 94 in one platelet are offset from, but overlap corresponding holes 92 and 94 in the other platelet. This platelet orientation is continued throughout the stack so that a passage is formed by each set of overlapping holes. In this manner, each axial passage extends in a clockwise or counterclockwise direction as it extends through the thickness of the stack. The resultant construction has a multitude of generally parallel, spiral, circumferentially and axially extending passages. The axial extension of a number of these passages is diagrammatically shown in FIG. 8 and indicated with reference characters 92A, 92B, 94A and 94B. As discussed above, adjacent platelets are generally oriented as shown in FIGS. 9 and 10. The holes in FIG. 9 which are interconnected by channels 96 are coupled to a first fluid line, while the holes in FIG. 10 which are interconnected by channels 96 are coupled to a second fluid line. In this manner, desirable counterflow between adjacent platelets can be achieved as one platelet can provide flow in the radially outward direction and the platelet adjacent thereto can provide flow in the radially inward direction as will be described in more detail below. The outermost plates (preferably several of these plates at each end) are not provided with radial channels, to provide fluid boundaries and structural integrity of the fluid passages.

The foregoing arrangement of passages and channels provides a substantially uniform density of the mass that forms the recuperator, and, thus improves gamma shielding efficiency. However, it should be understood that although the generally radially extending channels and generally axially extending passages are arranged so that the central portion of the heat exchanger has an essentially uniform density for effective gamma shielding, it is somewhat less dense than the remainder of the heat exchanger (i.e., the portion that extends radially outward from the outermost generally axial passages) as would be apparent from the foregoing description. However, when the center hole and axial passageways are filled with the poison rod and control drum shafts 36, respectively, the overall density of the heat exchanger still is substantially uniform due to the relatively small size of the channels and accompanying passages, for example, so that gamma rays are uniformly attenuated and low density regions that would allow strong gamma ray penetration are eliminated.

To further enhance the uniform density of the recuperator, the channels are configured to provide an essentially constant width between adjacent radially extending channels. In the preferred embodiment, the channels are configured as involute spirals. The width of each flow channel also can be increased in the radially outward direction to further maintain an essentially constant width between adjacent channels. In a further preferred embodiment, a group of channels can fluidly couple each pair of alternating openings 92 and 94. Although each channel 96 is replaced by a group of channels 96', only one such group of channels is diagrammatically shown in FIG. 10 and designated with reference numeral 96' for simplification. The group of channel 96' can include channel 96, as shown in the drawings as indicated by the dashed reference numeral in FIG. 10. This configuration further enhances the uniformity of the recuperator mass density and counterflow between adjacent plates in the vertical direction.

Figure 7:
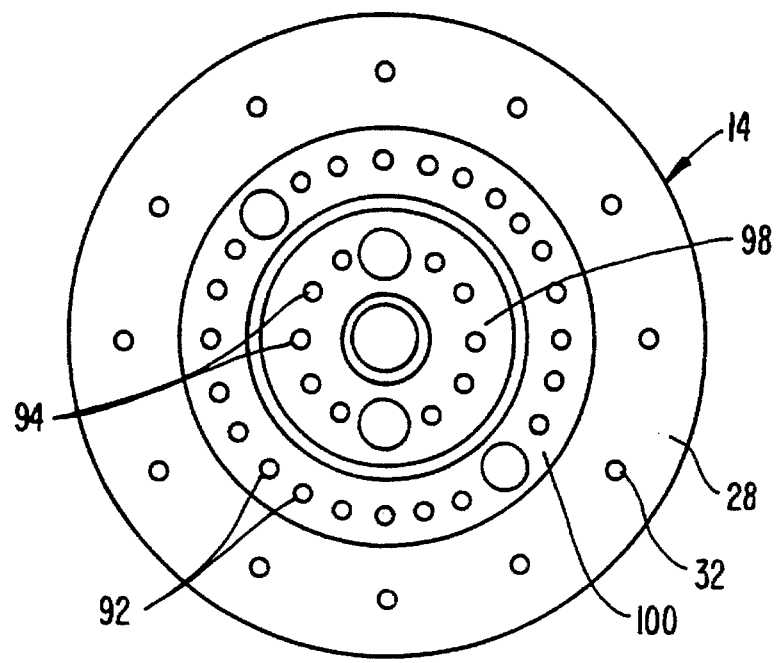
FIG. 7 is a top view of the heat exchanger of FIG.
Figure 8:
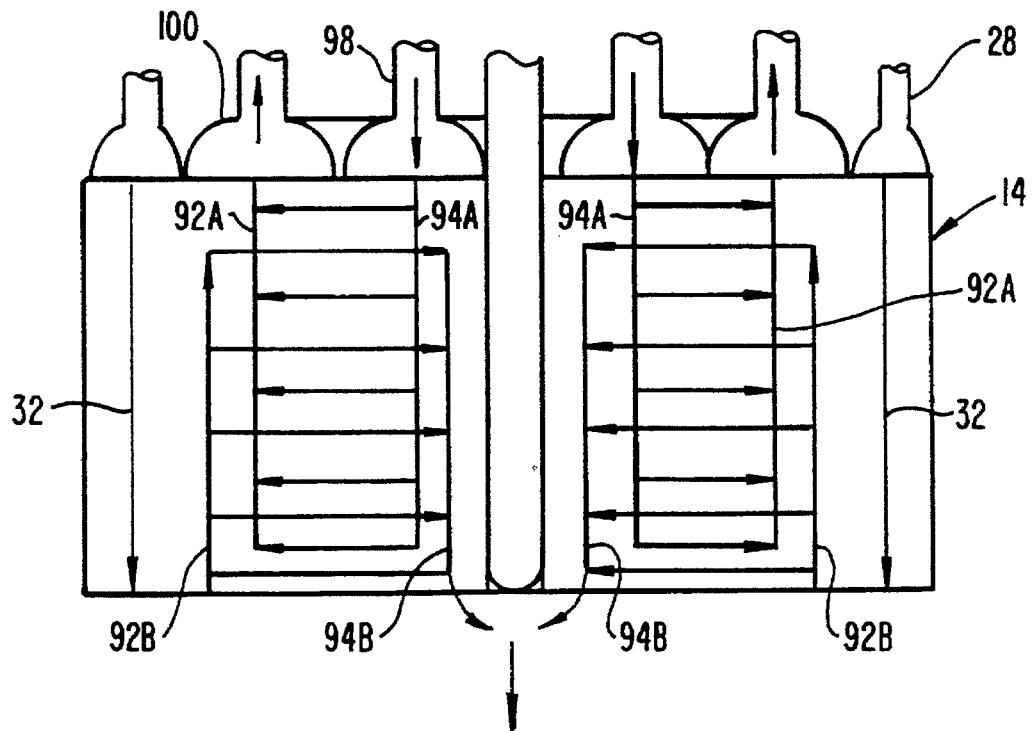
FIG. 8 is a diagrammatic representation of the flow pattern of the heat exchanger of FIG. 1.

Referring to FIG. 8, the flow pattern is diagrammatically shown. A multitude of radially extending generally involute, spiral channels interconnect outer and inner axial passages 92A & 94A and 92B & 94B. More specifically, liquid propellant is introduced through manifold 98 to inner holes or passageways 94 (FIG. 7). The propellant flows both downwardly through outer passageways 94A (formed by alternating platelet holes 94) and radially outward along channels or grooves 96 to passageways 92A (formed by alternating platelet holes 92) from which the gaseous propellant then exits the heat exchanger via manifold 100 and is delivered to the turbine. The turbine exhaust is routed to manifolds 28 from where it is circulated through the reflector assembly and reactor core and reintroduced via channel 40 in strut 30 to the inlet of axial passages 92B in the recuperator. From there it flows upwardly through passages 92B and radially inward along grooves 96 to inner passages 94B from which it is discharged to neutron shielding member 106 before flowing through the fuel assemblies.

Referring to FIGS. 1 and 2, the central inner wall of reactor vessel 46 extends upwardly toward recuperator 14 to provide a passage for propellant discharged from the recuperator to lower plenum 64 before entering the fuel assemblies. This inner wall vessel extension 108 is tubular and includes an enlarged generally disc-shaped portion 110 which preferably contains neutron shielding member 106. Neutron shielding member 106 preferably comprises stacked plates comprising metallic hydride. Zirconium hydride and lithium hydride are examples of suitable materials. The plates are provided with a dense configuration of radially extending channels interconnected by axially arranged holes, which can be provided as described above with respect to recuperator 14, but with a single fluid circuit as opposed to the recuperator twin fluid circuit described above, to allow the gaseous hydrogen propellant to flow throughout member 106 and shield the recuperator and vehicle from neutron bombardment.

Figure 11:
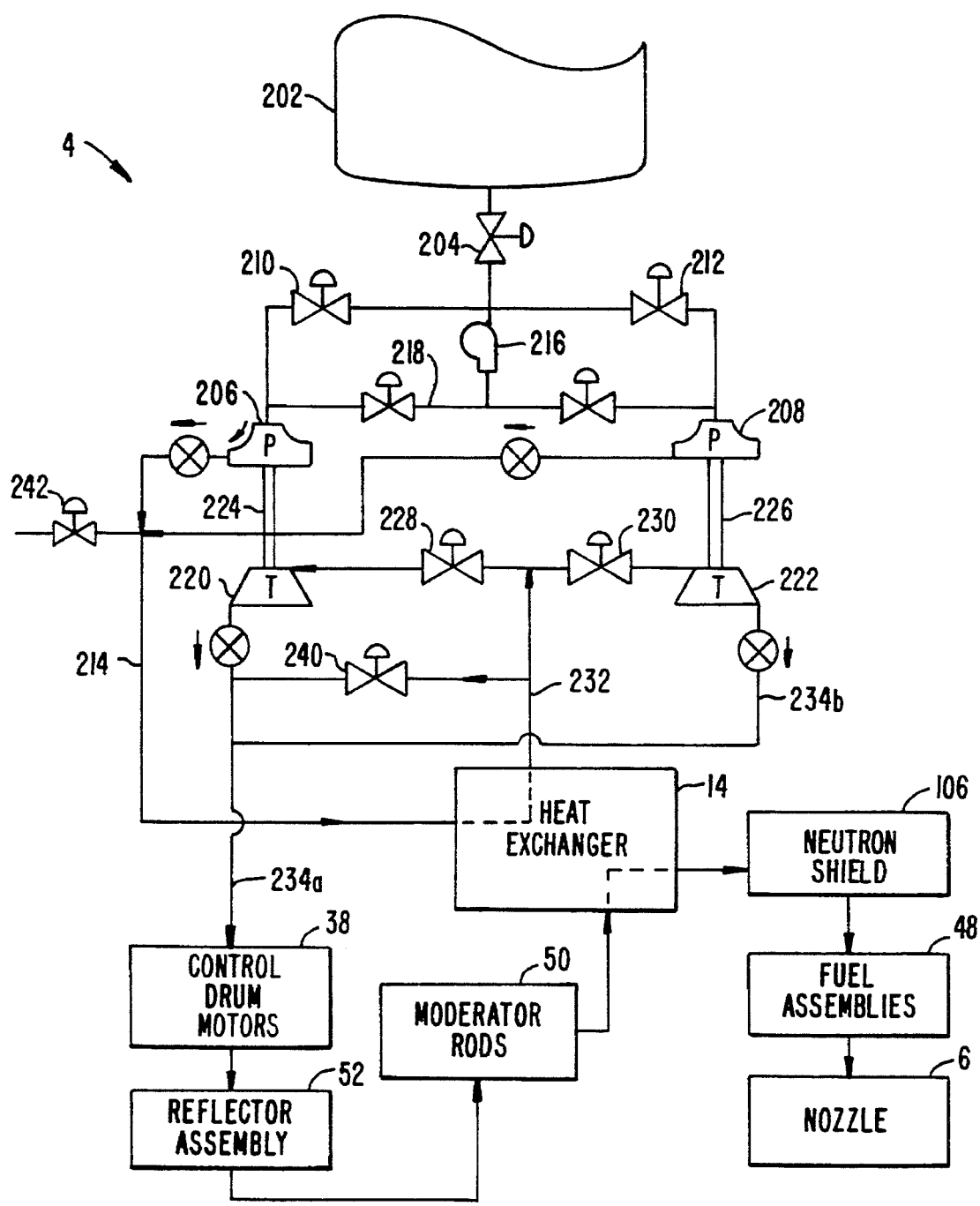
FIG. 11 is a diagrammatic representation of a nuclear thermal rocket engine showing the nozzle assembly of FIG. 1 coupled to a primary feed system in accordance to the present invention.

Referring to FIG. 11, the primary feed system will be described in detail. Primary feed system 4 is a "topping power cycle" in which excess reactor heat is used to run feed system 4. The liquid hydrogen is stored in a main tank 202 located within the rocket upstream of feed system 4. A tank valve 204 coupled to main tank 202 can be opened to allow the liquid hydrogen to enter feed system 4. Two turbopumps 206, 208 coupled to tank valve 204 function to draw the hydrogen from main tank 202, pressurize it and then pump the high pressure hydrogen through feed system 4. Pump inlet valves 210, 212 are disposed between tank valve 204 and pumps 206, 208 to control the flow of the hydrogen through either one of the pumps 206, 208. Pumps 206, 208 are fluidly connected to heat exchanger 14 by a primary feed line 214.

To help start pumps 206, 208, an electric pump 216 is positioned along an alternative flow path 218 between main tank 202 and pumps 206, 208. Electric pump 216 initially draws hydrogen from main tank 202 to start the flow of hydrogen through pumps 206, 208. Once pumps 206, 208 begin running, electric pump 216 is turned off and the hydrogen flows through valves 210, 212. Electric pump 216 can also be used as a back-up pump if a mechanical problem occurs or for low thrust operation during flight.

Two turbines 220, 222 are coupled to pumps 206, 208 by rotating shafts 224, 226. Turbines 220, 222 rotate shafts 224, 226 and drive pumps 206, 208 when heated hydrogen enters the turbines through turbine inlet valves 228, 230. Turbine inlet valves 228, 230 are fluidly connected to heat exchanger 14 by a turbine inlet flow path 232. The outlets of turbines 220, 222 are fluidly connected to control drum motors 38 and reflector assembly 52 by lines or paths 234a,b.

The liquid hydrogen is pumped through primary feed line 214 and into heat exchanger 14 where it is heated and gasified by hydrogen entering the heat exchanger from the reactor core (discussed below). The heated hydrogen then flows along turbine inlet path 232 through turbine inlet valves 228, 230 and drives turbines 220, 222. After driving turbines 220, 222, the hydrogen is exhausted and passes through turbine outlet paths 234a,b into control drum manifold 28 via inlets 29 and cools control drum motors 38 as it flows around the motors. From there it is circulated through strut channels 34 and reflector assemblies 52 from which it is discharged to lower reactor plenum 57 (FIGS. 1 and 6). Then the hydrogen passes through lower reactor support plate holes 59, between moderator rods 50, through upper reactor support plate holes 59 (FIG. 5) and into upper reactor plenum 55 before returning to recuperator or heat exchanger 14 via strut channels 40. The hydrogen passes through the heat exchanger and is discharged into neutron shield 106 as discussed above. Reflector assembly 52 and moderator rods 50 and neutron shield 106 transfer excess reactor heat (created as a byproduct of fuel fissions) to the hydrogen. Although the hydrogen was initially heated in heat exchanger 14, its temperature is sufficiently lowered in the turbines to receive the excess reactor heat and thereby cool reflector assembly 52 and moderator rods 50.

Before being discharged from the heat exchanger to neutron shield 106, the hydrogen cools to a relatively low temperature as it transfers most of its heat to the liquid hydrogen coming from primary feed line 214 (discussed above). The relatively cool hydrogen is then directed through neutron shield 106 to bottom plenum 64, through vessel holes 62 and bellows members 60 and into fuel assemblies 48, where it is heated to the full outlet temperature, and propelled through nozzle 6. Nozzle 6 is preferably a convergent-divergent nozzle that accelerates the hydrogen to mach 1.0 at the throat. The hydrogen is then expanded and accelerated beyond mach 1.0 into space to provide thrust for the rocket.

A control valve 240 is positioned between turbine inlet path 232 and turbine outlet path 234 and a chilldown valve 242 is positioned along primary feed line 214. Control valve 240 can be opened to allow the heated hydrogen exiting heat exchanger 14 to bypass turbines 220, 222 and directly enter cooling manifold 28 via inlets 29 to cool control drum motors 38 before entering strut channels 34. This reduces the turbine power and feed system hydrogen flow. Chilldown valve 242 can be opened to bleed a portion of the liquid hydrogen exiting pumps 206, 208 for cooling the pumps before operating them.

The above is a detailed description of a particular embodiment of the invention. It is recognized that departures from the disclosed embodiment may be made within the scope of the invention and that obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. A nuclear rocket engine comprising:

a nuclear reactor core including multiple fuel assemblies, each having an inlet and an outlet, and moderator rods disposed therebetween;

a reflector assembly that surrounds said core, said reflector assembly having multiple passages formed therein for facilitating coolant flow through said assembly;

a vessel that houses said reflector assembly and nuclear reactor core;

a nozzle assembly surrounding said reflector assembly and reactor core, said nozzle assembly including a nozzle block having a plenum and a nozzle throat region, said plenum having an upstream portion fluidly coupled to the outlets of said fuel assemblies and a downstream portion fluidly coupled to said nozzle throat region; and multiple struts extending from exterior regions of said vessel, said struts extending through said nozzle throat region to form multiple nozzle throats in said region, each strut having a channel formed therein that is fluidly coupled to at least one of said passages in said reflector assembly.

2. The engine of claim 1 wherein said struts have a generally teardrop-shaped transverse section in said nozzle throat region.

3. The engine of claim 2 further including multiple generally teardrop-shaped shrouds, each shroud surrounding one of said struts in said nozzle throat region and being spaced from that strut to form a space therebetween.

4. The engine of claim 2 further including multiple shrouds, each shroud surrounding one of said struts in said nozzle throat region and being spaced from that strut to form a space therebetween.

5. The engine of claim 4 wherein said shroud is positioned to prevent contact between said strut and said shroud.

6. The engine of claim 1 wherein said reflector assembly includes a reflector block and control drums, said reflector assembly passages being formed in said reflector block and said control drums being rotatably mounted in selected ones of said reflector assembly passages, each control drum being spaced from said reflector block to form a channel therebetween, said strut channels being fluidly coupled to said reflector assembly channels.

7. The engine of claim 6 further including a drive for each control drum, each drive having a shaft that extends through one of said strut channels and is coupled to one of said control drums, said nozzle block being positioned between said reactor core and said drives and comprising a material that forms a gamma shield.

8. The engine of claim 7 wherein said fuel assemblies have downstream end portions that are fixedly secured to said nozzle block.

9. The engine of claim 7 wherein said nozzle block is tungsten alloy.

10. The engine of claim 1 further including an upper plenum above said moderator rods in said reactor vessel, a lower plenum below said moderator rods in said reactor vessel and a passageway extending between a number of said moderator rods and fluidly coupling said upper and lower plenums, at least one of said struts including a second channel formed therein that is fluidly coupled to said upper plenum and said reflector assembly passage being fluidly coupled to said lower plenum.

11. The engine of claim 10 further including a recuperator having an inlet fluidly coupled to said second channel and an outlet fluidly coupled to said fuel assemblies, whereby heat can be transferred from said reflector assembly and reactor core to said recuperator.

12. The engine of claim 12 further including a pump and a turbine, said recuperator further including a second inlet and outlet, said pump having an outlet coupled to the second inlet of said recuperator and said turbine having an inlet coupled to the second outlet of said recuperator, said turbine having an outlet fluidly coupled to the first channel in said strut.

13. The engine of claim 12 wherein said nozzle block is positioned between said recuperator and said reactor core, and said nozzle block and recuperator form gamma shields.

14. The engine of claim 13 further including a neutron shield between said nozzle block and said recuperator.

15. The engine of claim 14 wherein said neutron shield comprises a hydride.

16. The engine of claim 1 wherein said throats are parallel.

17. The engine of claim 1 wherein said reactor vessel comprises a toroidal portion and a conical portion extending therefrom.

18. A nuclear rocket engine comprising:

a nuclear reactor core including multiple fuel assemblies, each having an inlet and an outlet, and moderator rods disposed therebetween;

a reflector assembly that surrounds said core, said reflector assembly having multiple passages formed therein for facilitating coolant flow through said assembly;

a vessel that houses said reflector assembly and nuclear reactor core;

a nozzle assembly surrounding said reflector assembly and said reactor core, said nozzle assembly including a nozzle block having a plenum and a nozzle throat region, said plenum having an upstream portion fluidly coupled to the outlets of said fuel assemblies and a downstream portion fluidly coupled to said nozzle throat region; and multiple struts extending from exterior regions of said vessel, said struts extending through said nozzle throat region to form multiple nozzle throats between said struts, each strut having first and second channels formed therethrough, said first channel and second channels being fluidly coupled to one another via a path extending through a number of said reflector assembly passages and said reactor core.

* * * * *